United States Patent
Codilian et al.

(10) Patent No.: US 6,735,041 B1
(45) Date of Patent: May 11, 2004

(54) METHOD FOR SEEKING IN A MAGNETIC DISK DRIVE HAVING A SPIRAL TRACK

(75) Inventors: Raffi Codilian, Irvine, CA (US); Charles W. Frank, Jr., Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 259 days.

(21) Appl. No.: 10/112,434

(22) Filed: Mar. 29, 2002

(51) Int. Cl.⁷ ............................................... G11B 5/596
(52) U.S. Cl. ................................................... 360/78.06
(58) Field of Search .......................... 360/78.07, 78.08, 360/78.09, 78.05, 70, 75, 77.08, 77.11, 77.02, 77.07, 48, 77.06

(56) References Cited

U.S. PATENT DOCUMENTS

| | | | |
|---|---|---|---|
| 4,157,577 A | * 6/1979 | Porter, Jr. et al. | 360/77.07 |
| 4,608,618 A | * 8/1986 | Sturtevant-Stuart | 360/135 |
| 4,636,885 A | 1/1987 | Yamada et al. | |
| 4,737,869 A | * 4/1988 | Sugaya et al. | 360/77.08 |
| 4,980,876 A | * 12/1990 | Abate et al. | 369/44.11 |
| 5,119,248 A | 6/1992 | Bizjak et al. | |
| 5,583,712 A | * 12/1996 | Brunelle | 360/77.07 |
| 5,619,387 A | 4/1997 | Ottesen et al. | |
| 5,668,679 A | * 9/1997 | Swearingen et al. | 360/75 |
| 5,856,735 A | * 1/1999 | Sakashita | 318/696 |
| 6,466,385 B1 | * 10/2002 | Umeda et al. | 360/16 |

OTHER PUBLICATIONS

Masud Mansuripur, Principles of Optical Disk Date Storage, Optical Sciences Center, University of Arizona, Tucson, AZ.

* cited by examiner

Primary Examiner—David Hudspeth
Assistant Examiner—Fred F. Tzeng
(74) Attorney, Agent, or Firm—Milad G. Shara, Esq.; Robroy R. Fawcett, Esq.

(57) ABSTRACT

A method is disclosed for seeking from first radial position on a spiral track of a magnetic disk drive to a second radial position. The disk having the spiral track rotates at a constant angular velocity. The servo sectors on the spiral track may not be aligned along a radius. A head transit time is determined for moving the head to the second radial position. A first control current pulse is applied to an actuator to move the head toward the second radial position. A timer is commenced for measuring the expiration of the head transit time after applying the first control current pulse. After expiration of the head transit time, a second control current pulse is applied to the actuator to terminate the head movement. At least one servo sector along the spiral track is then read to locate the position of the head.

16 Claims, 5 Drawing Sheets

METHOD FOR SEEKING IN A MAGNETIC DISK DRIVE HAVING A SPIRAL TRACK

BACKGROUND OF THE INVENTION

1. Field of the Invention

The present invention relates to digital information storage, and more particularly, to a method for seeking in a magnetic disk drive having a spiral track.

2. Description of the Prior Art

A magnetic disk drive provides a nonvolatile disk media for storage of user and application information. The disk media is generally formatted to store the information in concentric rings or tracks. The concentric tracks are followed using embedded servo wedges that are sampled during disk access operations. To switch from one track to another, the disk drive must perform a mechanical seek operation to move a transducer head to the desired track. During a seek, the stored information may not be accessed. When the disk drive is providing streaming media information, such as a video or audio information, to a host, the information must be buffered to prevent annoying discontinuities during playback of the streaming media. Also, to increase the storage capacity of the disk drive, the disk media may be divided into zones, with more of the uniformly-sized data blocks being written between the servo wedges on the outer tracks than are written between the servo wedges on the inner tracks. Nevertheless, the linear circumferential distance of a track varies as its radial distance from the center of the disk varies. Thus, a substantial number of the tracks often have a portion that is unused because it is smaller that the uniformly-sized data blocks. Alternatively, the tracks may have data blocks that straddle servo wedges using techniques requiring increased format overhead.

Accordingly, there exists a need for a disk drive and related techniques for using a magnetic disk media format that efficiently stores information and that allows more continuous information playback from a magnetic disk. The present invention satisfies this need.

SUMMARY OF THE INVENTION

The present invention may be embodied in a method, implemented in a magnetic disk drive, for seeking from a current storage segment at a first radial position on a spiral track of a magnetic disk to a desired storage segment at a second radial position. The disk drive has a transducer head, the magnetic disk with the spiral track, and an actuator for moving the head across and positioning the head over a surface of the magnetic disk in response to control currents. The magnetic disk rotates at a constant angular velocity and the spiral track has contiguous storage segments. Each storage segment includes a servo sector and a predetermined number of data sectors. The storage segments are situated along the spiral track such that the servo sectors may not be aligned along a radius of the magnetic disk. A head transit time is determined for moving the head from the first radial position to the second radial position according to a desired velocity profile. A first control current pulse is applied to the actuator. The first control current pulse has an amplitude and a duration designed to cause the head to move from the first radial position toward the second radial position at a coast velocity resulting solely from the application of the first current pulse and not resulting from a velocity measurement during the head movement from the first radial position to the second radial position. After applying the first control current pulse to the actuator, a timer is commenced for measuring the expiration of the head transit time after applying the first control current pulse. After expiration of the head transit time, a second control current pulse is applied to the actuator to terminate the head movement. After applying the second control current pulse, at least one servo sector along the spiral track is read to locate the position of the head with respect to the desired storage segment.

In more detailed features of the invention, the head transit time is determined by off-line calculation of head transit times based on relative radial positions of the storage segments, storing the calculated head transit times in a table on the disk drive, and selecting a head transit time from the table based on the first radial position and the second radial position. Alternatively, the head transit time may be determined by providing a predicted head transit time between two predetermined radial positions on the disk according to the desired velocity profile, and deriving the head transit time, for moving the head from the first radial position to the second radial position, based on the predicted head transit time. The head transit time also may be derived based on an interpolation using the predicted head transit time and the relative positions of the first and second radial positions with respect to the two predetermined radial positions.

In another embodiment of the invention, after applying the first current pulse to the actuator and commencing the timer, a servo sector, that may be encountered during the head movement, may be read to determine the actual position of the head at the encountered servo sector. The head transit time may be adjusted based on the actual position of the head at the encountered servo sector. After expiration of the adjusted head transit time, second control current pulse is applied to the actuator to terminate the head movement.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
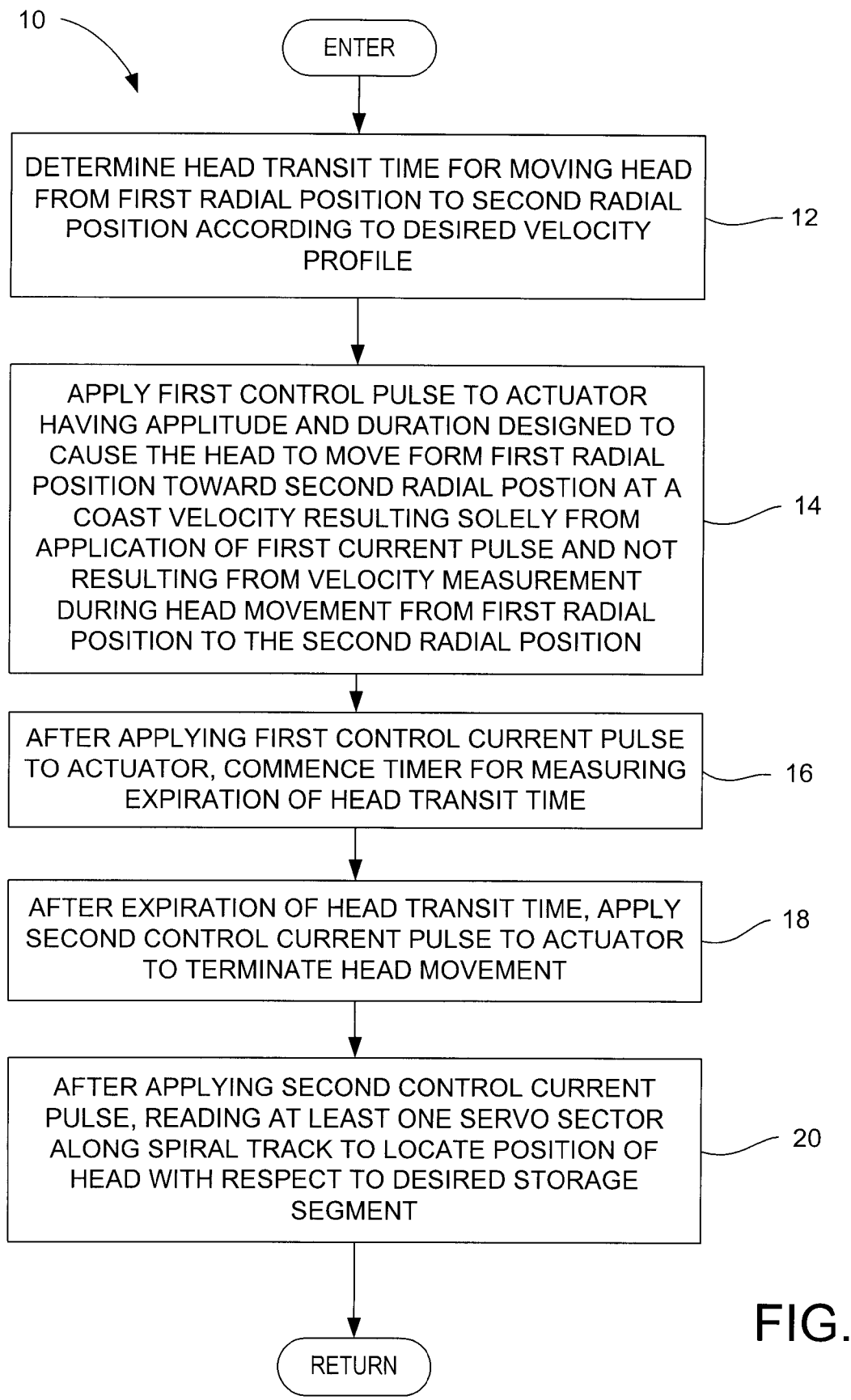
FIG. 1 is a flow chart illustrating an embodiment of a method for seeking in a magnetic disk drive having a spiral track, according to the present invention.
Figure 2:
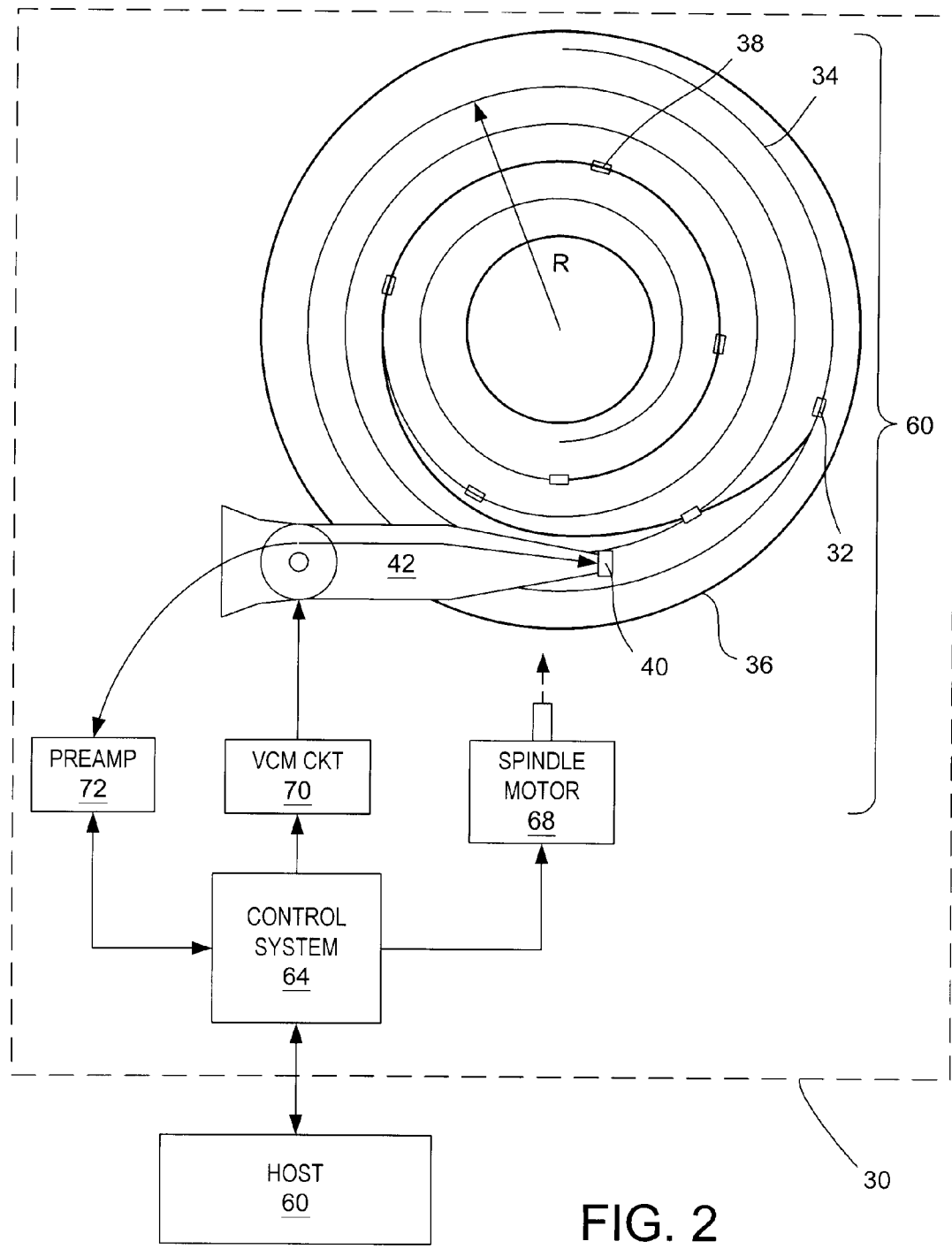
FIG. 2 is a block diagram of a computer system having a disk drive with a spiral track for implementing the method of FIG. 1.
Figure 3:
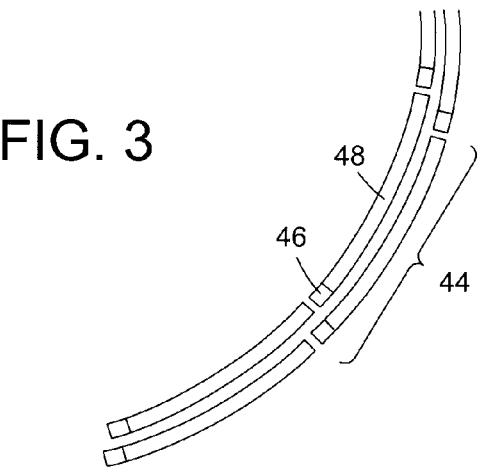
FIG. 3 is a schematic diagram of storage segments forming the spiral track in FIG. 2.
Figure 4:
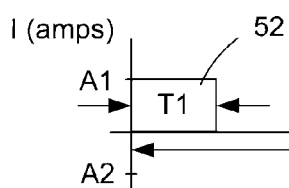
FIG. 4 is a graph showing control current and head velocity versus time during a seek.
Figure 4:
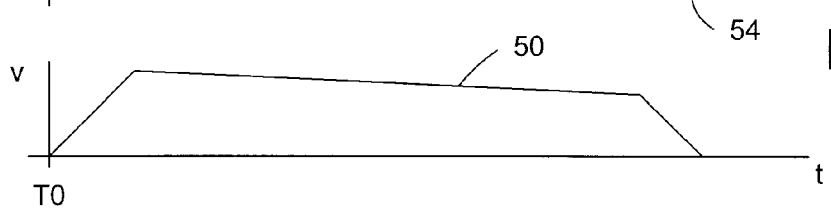

With reference to FIGS. 1 through 4, the present invention may be embodied in a method 10 (FIG. 1), implemented in a disk drive 30 (FIG. 2), for seeking from a current storage segment at a first radial position 32 on a spiral track 34 of a magnetic disk 36 to a desired storage segment at a second radial position 38. The disk drive has a transducer head 40 and an actuator 42 for moving the head across and positioning the head over a surface of the magnetic disk in response to control currents I (FIG. 4). The magnetic disk rotates at a constant angular velocity and the spiral track has contiguous storage segments 44 (FIG. 3). Each storage segment includes a servo sector 46 and a predetermined number of data sectors 48. The storage segments are situated along the spiral track such that the servo sectors may not be aligned along a radius R of the magnetic disk. In the method, a head transit time TR is determined for moving the head from the first radial position to the second radial position according to a desired velocity profile 50 (step 12). A first control current 52 pulse is applied to the actuator (step 14). The first control current pulse has an amplitude and a duration designed to cause the head to move from the first radial position toward the second radial position at a coast velocity resulting solely from the application of the first current pulse and not resulting from a velocity measurement during the head movement from the first radial position to the second radial position. After applying the first control current pulse to the actuator, a timer is commenced for measuring the expiration of the head transit time after applying the first control current pulse (step 16). After expiration of the head transit time, a second control current pulse 54 is applied to the actuator to terminate the head movement (step 18). After applying the second control current pulse, at least one servo sector along the spiral track is read to locate the position of the head with respect to the desired storage segment (step 20).

The spiral track 34 allows the magnetic disk drive 30 to deliver long sequential reads of stored information without single-track seeks. For example, an entire movie may be played by a host 60 with disk drive performing few, if any, single-track seeks. The spiral track techniques of the disk drive also may be advantageous for use in a back up system where data storage capacity and efficiency is favored over seek performance.

The head transit time TR may be determined by off-line calculation of head transit times based on relative radial positions of the storage segments. The calculated head transit times may be stored in a table on the disk drive 30. A head transit time may be selected from the table based on the first radial position and the second radial position. Alternatively, the head transit time may be determined by providing a predicted head transit time between two predetermined radial positions on the disk 36 according to the desired velocity profile 50, and deriving the head transit time, for moving the head 40 from the first radial position 32 to the second radial position 38, based on the predicted head transit time. The head transit time also may be derived based on an interpolation using the predicted head transit time and the relative positions of the first and second radial positions with respect to the two predetermined radial positions.

Without velocity feedback during the head coast, the seek is dependent on accurate prediction of the velocity profile 50. The accuracy of the velocity profile prediction may be improved by lowering the velocity of the seek. Because of the spiral track 34, seeks should be less common in streaming media applications and the low coast velocity should be less a factor in the disk drive's overall performance. Also, the velocity profile prediction should take into account factors that result in a decreasing coast velocity over time. Further, the prediction should undershoot the desired position 38. If the head 40 arrives a turn before the desired position, the disk drive 30 may track follow along the spiral track for a disk rotation until the head arrives at the desired position. If the head arrives at a position after the desired position, another seek may be required.

Although the arrival time of a servo sector 46 during a coast velocity seek may not be accurately predicted, a chance encounter with a servo sector may improve the seek's accuracy. During a seek, the control system 64 may continuously monitor for servo sectors during the seek trajectory.

Figure 5:
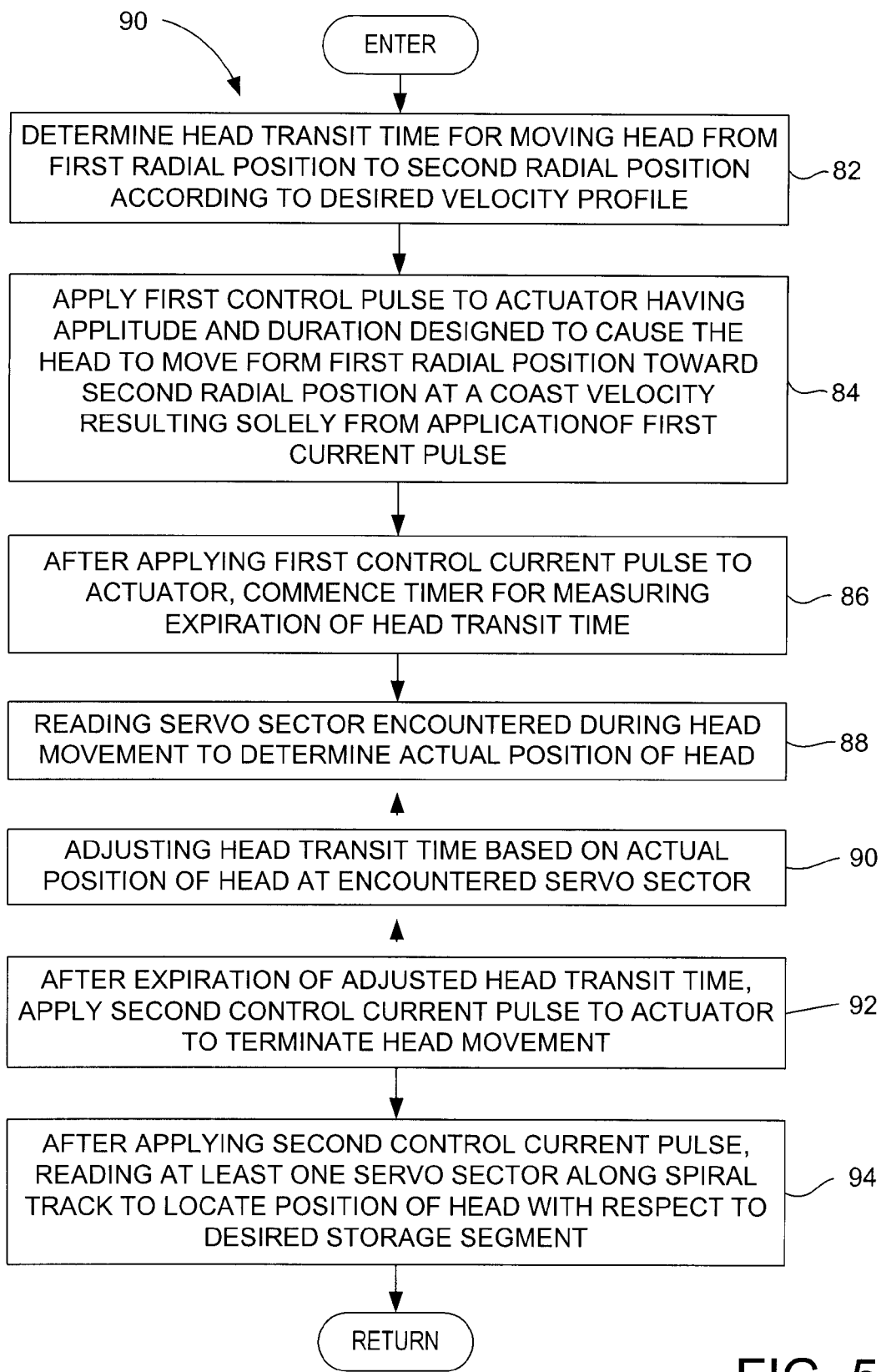
FIG. 5 is a flow chart illustrating another embodiment of a method for seeking in a magnetic disk drive having a spiral track, according to the present invention.
Figure 6:
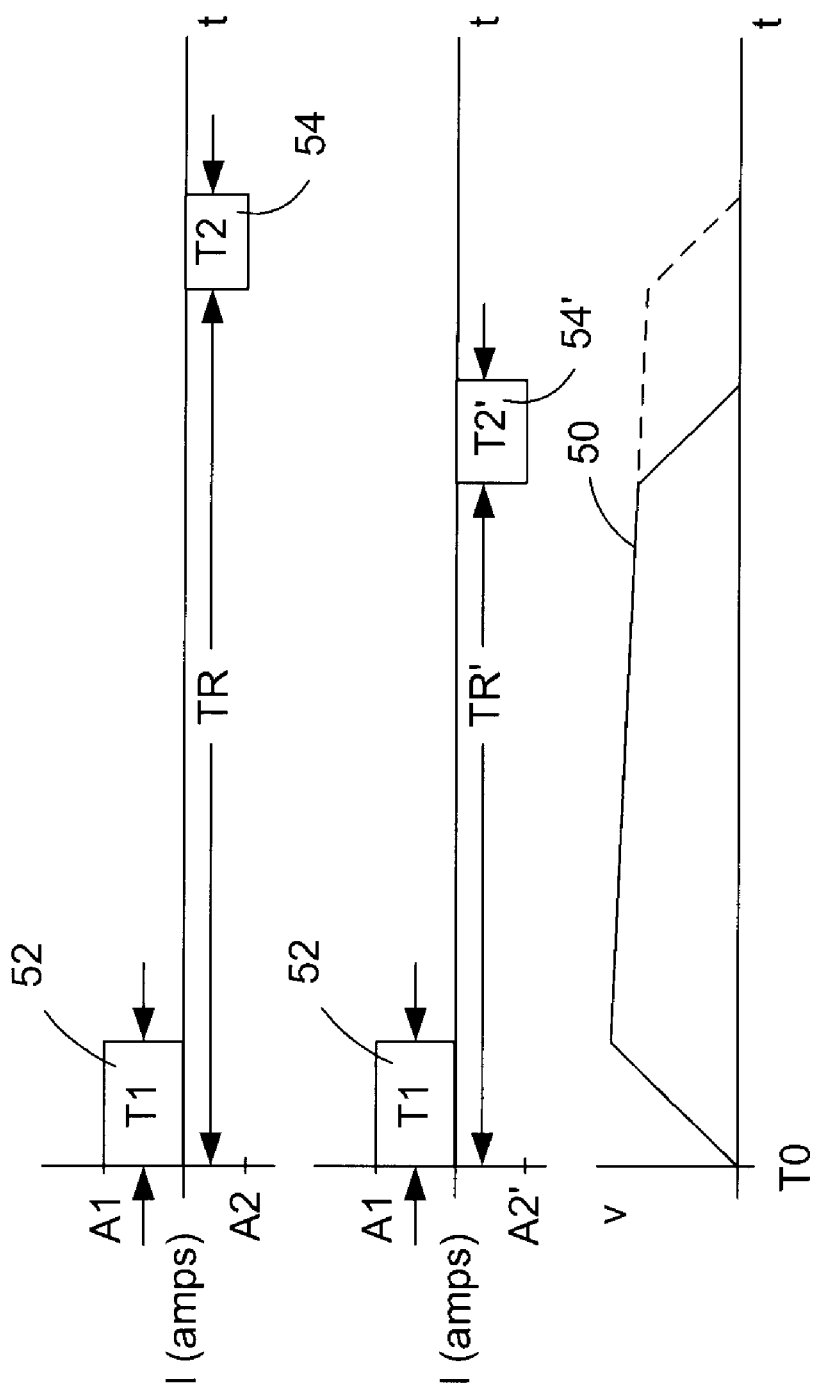
FIG. 6 is a graph showing control current and head velocity versus time during a seek.

Accordingly, in a method 80 that alternatively embodies the present invention, shown with respect to FIGS. 5 and 6, a head transit time TR is determined for moving the head from the first radial position to the second radial position according to a desired velocity profile 50 (step 82). A first control current 52 pulse is applied to the actuator (step 84). The first control current pulse has an amplitude and a duration designed to cause the head to move from the first radial position 32 toward the second radial position 38 at a coast velocity resulting solely from the application of the first current pulse and not resulting from a velocity measurement during the head movement from the first radial position to the second radial position. After applying the first control current pulse to the actuator, a timer is commenced for measuring the expiration of the head transit time after applying the first control current pulse (step 86). After applying the first current pulse to the actuator and commencing the timer, a servo sector 46, which may be encountered during the head movement, may be read to determine the actual position of the head 40 at the encountered servo sector (step 88). The head transit time may be adjusted based on the actual position of the head at the encountered servo sector (step 90). After expiration of the adjusted head transit time, second control current pulse 54' is applied to the actuator to terminate the head movement (step 92). After applying the second control current pulse, at least one servo sector along the spiral track is read to locate the position of the head with respect to the desired storage segment (step 94).

The disk drive 30 includes a control system 64 and a head-disk assembly (HDA) 66. The control system includes circuitry and processors that control the HDA and that provide an intelligent interface between the host 60 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA may include a spindle motor 68, at least one disk 36 having a magnetic media surface for providing the spiral track 34, the rotary actuator 42, a transducer head 40, a voice coil motor (VCM) circuit 70, and a preamplifier 72.

The magnetic media surface is accessed using the head 40. The spiral track 34 on the media surface may be divided into the storage segments. Each storage segment may begin with the servo sector 46 which is followed by the data sectors 48. The data sectors may include data blocks, each generally storing 512 data bytes. Each data block may be addressed using a logical block address (LBA).

We claim:

1. In a disk drive having a transducer head, a magnetic disk with a spiral track, and an actuator for moving the head across and positioning the head over a surface of the magnetic disk in response to control currents, the magnetic disk rotating at a constant angular velocity and the spiral track having contiguous storage segments, each storage segment including a servo sector and a predetermined number of data sectors, the storage segments being situated along the spiral track such that the servo sectors may not be aligned along a radius of the magnetic disk, a method for seeking from a current storage segment at a first radial position to a desired storage segment at a second radial position, comprising:

determining a head transit time for moving the head from the first radial position to the second radial position according to a desired velocity profile;

applying a first control current pulse to the actuator, wherein the first control current pulse has an amplitude and a duration designed to cause the head to move from the first radial position toward the second radial position at a coast velocity resulting solely from the application of the first current pulse and not resulting from a velocity measurement during the head movement from the first radial position to the second radial position;

after applying the first control current pulse to the actuator, commencing a timer for measuring the expiration of the head transit time after applying the first control current pulse;

after expiration of the head transit time, applying a second control current pulse to the actuator to terminate the head movement; and after applying the second control current pulse, reading at least one servo sector along the spiral track to locate the position of the head with respect to the desired storage segment.

2. A method for seeking a desired storage segment as defined in claim 1, wherein determining the head transit time comprises:

off-line calculation of head transit times based on relative radial positions of the storage segments;

storing the calculated head transit times in a table on the disk drive; and selecting a head transit time from the table based on the first radial position and the second radial position.

3. A method for seeking a desired storage segment as defined in claim 1, wherein determining the head transit time comprises:

providing a predicted head transit time between two predetermined radial positions on the disk according to the desired velocity profile; and deriving the head transit time, for moving the head from the first radial position to the second radial position, based on the predicted head transit time.

4. A method for seeking a desired storage segment as defined in claim 1, wherein determining the head transit time comprises:

providing a predicted head transit time between two predetermined radial positions on the disk according to the desired velocity profile; and deriving the head transit time based on an interpolation using the predicted head transit time and the relative positions of the first and second radial positions with respect to the two predetermined radial positions.

5. In a disk drive having a transducer head, a magnetic disk with a spiral track, and an actuator for moving the head across and positioning the head over a surface of the magnetic disk in response to control currents, the magnetic disk rotating at a constant angular velocity and the spiral track having contiguous storage segments, each storage segment including a servo sector and a predetermined number of data sectors, the storage segments being situated along the spiral track such that the servo sectors may not be aligned along a radius of the magnetic disk, a method for seeking from a current storage segment at a first radial position to a desired storage segment at a second radial position, comprising:

determining a head transit time for moving the head from the first radial position to the second radial position according to a desired velocity profile;

applying a first control current pulse to the actuator, wherein the first control current pulse has an amplitude and a duration designed to cause the head to move from the first radial position toward the second radial position at a coast velocity resulting solely from the application of the first current pulse and not resulting from a velocity measurement during the head movement from the first radial position to the second radial position;

after applying the first control current pulse to the actuator, commencing a timer for measuring the expiration of the head transit time after applying the first control current pulse;

reading a servo sector encountered during the head movement to determine the actual position of the head at the encountered servo sector;

adjusting the head transit time based on the actual position of the head at the encountered servo sector;

after expiration of the adjusted head transit time, applying a second control current pulse to the actuator to terminate the head movement; and after applying the second control current pulse, reading at least one servo sector along the spiral track to locate the position of the head with respect to the desired storage segment.

6. A method for seeking a desired storage segment as defined in claim 5, wherein determining the head transit time comprises:

off-line calculation of head transit times based on relative radial positions of the storage segments;

storing the calculated head transit times in a table on the disk drive; and selecting a head transit time from the table based on the first radial position and the second radial position.

7. A method for seeking a desired storage segment as defined in claim 5, wherein determining the head transit time comprises:

providing a predicted head transit time between two predetermined radial positions on the disk according to the desired velocity profile; and deriving the head transit time, for moving the head from the first radial position to the second radial position, based on the predicted head transit time.

8. A method for seeking a desired storage segment as defined in claim 5, wherein determining the head transit time comprises:

providing a predicted head transit time between two predetermined radial positions on the disk according to the desired velocity profile; and deriving the head transit time based on an interpolation using the predicted head transit time and the relative positions of the first and second radial positions with respect to the two predetermined radial positions.

9. A disk drive, comprising:

a transducer head;

a magnetic disk with a spiral track, the magnetic disk rotating at a constant angular velocity and the spiral track having contiguous storage segments, each storage segment including a servo sector and a predetermined number of data sectors, the storage segments being situated along the spiral track such that the servo sectors may not be aligned along a radius of the magnetic disk;

an actuator for moving the head across and positioning the head over a surface of the magnetic disk in response to control currents;

means for seeking from a current storage segment at a first radial position to a desired storage segment at a second radial position, the seeking means including means for determining a head transit time for moving the head from the first radial position to the second radial position according to a desired velocity profile;

means for applying a first control current pulse to the actuator, wherein the first control current pulse has an amplitude and a duration designed to cause the head to move from the first radial position toward the second radial position at a coast velocity resulting solely from the application of the first current pulse and not resulting from a velocity measurement during the head movement from the first radial position to the second radial position;

timer means for measuring the expiration of the head transit time after applying the first control current pulse;

means for applying a second control current pulse to the actuator to terminate the head movement after expiration of the head transit time; and means for reading at least one servo sector along the spiral track after applying the second control current pulse to locate the position of the head with respect to the desired storage segment.

10. A disk drive as defined in claim 9, wherein the means for determining the head transit time comprises:

means for storing calculated head transit times generated from off-line calculation of head transit times based on relative radial positions of the storage segments in a table on the disk drive; and means for selecting a head transit time from the table based on the first radial position and the second radial position.

11. A disk drive as defined in claim 9, wherein the means for determining the head transit time comprises:

means for providing a predicted head transit time between two predetermined radial positions on the disk according to the desired velocity profile; and means for deriving the head transit time, for moving the head from the first radial position to the second radial position, based on the predicted head transit time.

12. A disk drive as defined in claim 9, wherein the means for determining the head transit time comprises:

means for providing a predicted head transit time between two predetermined radial positions on the disk according to the desired velocity profile; and means for deriving the head transit time based on an interpolation using the predicted head transit time and the relative positions of the first and second radial positions with respect to the two predetermined radial positions.

13. A disk drive, comprising:

a transducer head;

a magnetic disk with a spiral track, the magnetic disk rotating at a constant angular velocity and the spiral track having contiguous storage segments, each storage segment including a servo sector and a predetermined number of data sectors, the storage segments being situated along the spiral track such that the servo sectors may not be aligned along a radius of the magnetic disk;

an actuator for moving the head across and positioning the head over a surface of the magnetic disk in response to control currents;

means for seeking from a current storage segment at a first radial position to a desired storage segment at a second radial position, the seeking means including means for determining a head transit time for moving the head from the first radial position to the second radial position according to a desired velocity profile;

means for applying a first control current pulse to the actuator, wherein the first control current pulse has an amplitude and a duration designed to cause the head to move from the first radial position toward the second radial position at a coast velocity resulting solely from the application of the first current pulse and not resulting from a velocity measurement during the head movement from the first radial position to the second radial position;

timer means for measuring the expiration of the head transit time after applying the first control current pulse;

means for reading a servo sector encountered during the head movement to determine the actual position of the head at the encountered servo sector;

means for adjusting the head transit time based on the actual position of the head at the encountered servo sector;

means for to the actuator to terminate the head movement after expiration of the adjusted head transit time; and means for reading at least one servo sector along the spiral track after applying a second control current pulse to locate the position of the head with respect to the desired storage segment.

14. A disk drive as defined in claim 13, wherein the means for determining the head transit time comprises:

means for storing calculated head transit times generated from off-line calculation of head transit times based on relative radial positions of the storage segments in a table on the disk drive; and means for selecting a head transit time from the table based on the first radial position and the second radial position.

15. A disk drive as defined in claim 13, wherein the means for determining the head transit time comprises:

means for providing a predicted head transit time between two predetermined radial positions on the disk according to the desired velocity profile; and means for deriving the head transit time, for moving the head from the first radial position to the second radial position, based on the predicted head transit time.

16. A disk drive as defined in claim 13, wherein the means for determining the head transit time comprises:

means for providing a predicted head transit time between two predetermined radial positions on the disk according to the desired velocity profile; and means for deriving the head transit time based on an interpolation using the predicted head transit time and the relative positions of the first and second radial positions with respect to the two predetermined radial positions.

* * * * *